Patented Aug. 28, 1923.

1,466,241

UNITED STATES PATENT OFFICE.

TOKUJI NAEMURA, OF SANCHOME, KOBE, JAPAN.

FLOOR-COVER COMPOSITION.

No Drawing. Application filed November 30, 1921. Serial No. 518,875.

*To all whom it may concern:*

Be it known that I, TOKUJI NAEMURA, a subject of the Emperor of Japan, residing at No. 138 Isobe-Dori, Sanchome, Kobe, Japan, have invented new and useful Improvements in a Floor-Cover Composition, of which the following is a specification.

This invention relates to a floor cover something like linoleum, and consists of ordinary mat covered with a mixture of powdered soya bean or the like albuminous substances, ammonia water, fibres as binding material, and any desired pigment, and the object thereof is to obtain a covering for floor which is cheap, rich in elasticity and hard to burn.

The following is an example of carrying my invention into practice.

Take 4 parts of powdered soya bean, 1 part of sodium silicate, 0.2 part of ammonia water and 75 parts of water, and mix and stir them well. Add to this mixture 10 parts of hemp, wool, cotton or any other fibres, and a quantity of clay or any other desired pigment. Knead the mixture well and spread the paste thus obtained with a roll on a surface of mat woven with any material, such as grass filaments, shreds of cotton, linen, or any other textiles, shavings, paper or the like, and cause it to dry. After drying, any desired pattern may be printed on the coating. After printing pattern or without printing, spread over the coating water varnish, oil varnish or the like, and the covering for floor of my invention will be obtained.

In this invention, powdered soya bean is an important ingredient of the coating, and the ammonia is used to dissolve albuminous matters of the bean, while the sodium silicate solidifies again the albuminous matters acted upon and dissolved by the ammonia. Thus a coating which is water proof and almost fire proof, is obtained. The fibres are added as binding material, and the clay or the like, together with sodium silicate gives a proper hardness to the coating and at the same time forms the body thereof.

I am aware that there is known before this invention a method of coating mat with linoleum cement the principal ingredient of which is linoxin. But in this case, the oil contained in the linoleum cement soaks into the mat, and the whole becomes inflammable, and sometimes there is even danger of starting self-combustion.

I am also aware that before the present invention, there is known a method of making a linoleum-like floor cover by coating an ordinary mat with a film of india rubber, but in this method, the necessary process of vulcanizing will weaken the mat which forms the ground work.

The present invention, which is characterized by coating mat with a specially prepared pasty substance of which the principal ingredients are albuminous matters, ammonia, sodium silicate and fibres, has the following advantages:—

1. The coating adheres well to the mat and will never peel off, the two forming an elastic floor covering and giving pleasant feeling to those who walk on it.

2. The coating may be very easily spread over, and consequently the work is greatly simplified.

3. Compared with common linoleum, it is less inflammable, and also there is no danger of becoming brittle nor getting cracked.

4. There being no liability of their margins turning up, there is no necessity of nailing it to the floor.

5. The paste with which mat is coated, does not soak thereinto, and consequently either side can be used as floor cover.

6. It has the characteristics of both a common mat of grass and linoleum, and at the same time it does not easily wear out like the former, nor does it change its hardness according to climates like the latter. Moreover, it is not inflammable, and can be manufactured very cheap.

Claims:

1. A binding material for use as a floor covering or the like, comprising powdered soya bean, sodium silicate, ammonia water, water, hemp and pigment.

2. A binding material for use as a floor covering or the like, comprising powdered soya bean, sodium silicate, ammonia water, water, fibres and pigment.

3. A binding material for use as a floor covering or the like, comprising approximately: 4 parts powdered soya bean, 1 part sodium silicate, 0.2 parts ammonia water, 75 parts water, 10 parts fibres, and a quantity of pigment.

In testimony whereof I have signed my name to this specification.

TOKUJI NAEMURA. [L. S.]